Mar. 13, 1923.
T. A. RYAN
LOCKING DEVICE FOR MOTOR VEHICLES
Filed July 28, 1919
1,448,462
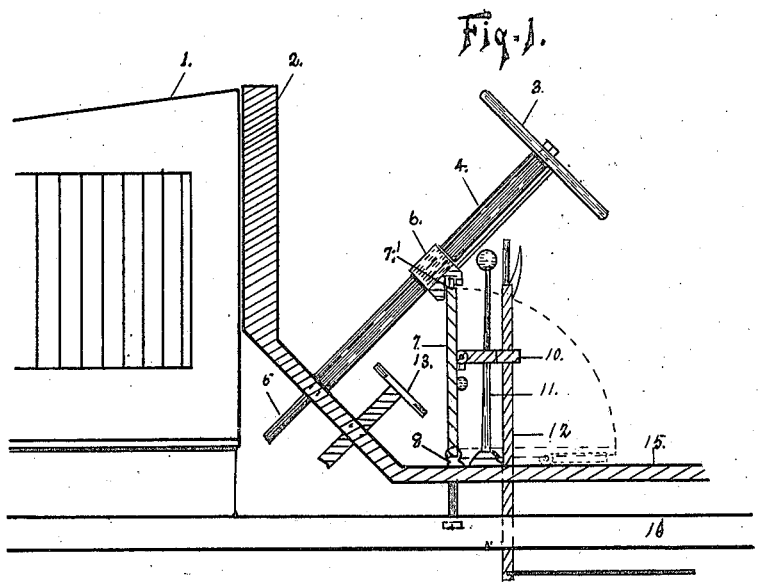
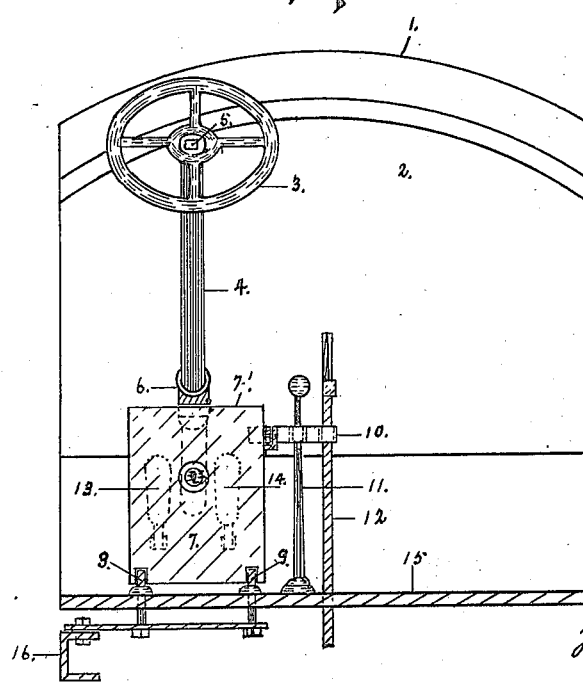
INVENTOR.
Thomas A. Ryan.

Patented Mar. 13, 1923.

1,448,462

UNITED STATES PATENT OFFICE.

THOMAS A. RYAN, OF YONKERS, NEW YORK.

LOCKING DEVICE FOR MOTOR VEHICLES.

Application filed July 28, 1919. Serial No. 313,704.

*To all whom it may concern:*

Be it known that I, THOMAS A. RYAN, a citizen of the United States, and a resident of the city of Yonkers, in the county of Westchester and the State of New York, have invented new and useful Improvements in Locking Devices for Motor Vehicles, of which this is a description, reference being made to the accompanying drawings, forming part of this specification.

My invention relates to locking devices for motor vehicles.

By a novel combination and construction of parts, I provide a locking mechanism for locking the steering and control mechanism of all motor vehicles. The invention combining a movable screen, a screen extension engaging the control levers, an engaging member on the steering column engaging the steering mechanism and screen, and preventing the operation of the steering mechanism and the control mechanism when in its locked position. The control locking mechanism made operable by a key or dial.

Other objects of the invention will appear from the following description thereof.

In the drawings.

Fig. 1 is a sectional side view of a portion of a motor vehicle showing a side view of the locking screen in its locked position. Fig. 2 is a view from the seat of a motor vehicle, showing a perspective of the screen in locked position. The numeral 1 is the hood of the vehicle, 2 the dash, 3 the steering wheel, 4 the steering column, 5 the steering post on which is mounted rigid, the engaging member 6, engaging the edge 7—1 of the screen 7, 8 and 9 are hinges secured to the vehicle, 10 is an extension arm engaging the control lever 11 and the brake 12 between the projections forming U shaped openings, thus preventing the operation of the control lever and the brake when the screen is in its locked position, also preventing the use of the control pedals 13 and 14 shown projecting through the floor 15. 16 is a section of the frame. The arm 10 can turn up only, this prevents its being turned when in locked position, but permits it to fold flat parallel with the screen when the screen is in unlocked position.

Having thus described my invention, what I claim as new, and wish to secure by Letters Patents, is—

1. In an automobile lock the combination of steering mechanism and control mechanism, an engaging member rigidly secured to said steering mechanism, a screen adapted to prevent operation of said steering mechanism and control mechanism when said screen is in locked position, and locking means for securing said screen in locked position.

2. In an automobile lock the combination of steering mechanism and control mechanism, an engaging member for said steering mechanism, a screen adapted to prevent operation of said steering mechanism and control mechanism when in locked position and locking means for securing said screen to said steering mechanism.

THOMAS A. RYAN.

Witnesses:
   JOSEPH A. RYAN,
   JOHN C. RYAN.